United States Patent
Pals et al.

(10) Patent No.: US 11,297,490 B2
(45) Date of Patent: Apr. 5, 2022

(54) RADIO RESOURCE CONTROL SIGNALING OF DIFFERENT USER EQUIPMENT CAPABILITY OF PARENT BAND COMBINATIONS

(71) Applicant: QUALCOMM Incorporated, San Diego, CA (US)

(72) Inventors: Timothy Paul Pals, San Diego, CA (US); Alberto Rico Alvarino, San Diego, CA (US); Amir Farajidana, Sunnyvale, CA (US); Honey Kakkar, San Diego, CA (US); Parastoo Kheirkhah, San Diego, CA (US); Nitin Pant, San Diego, CA (US); Umesh Phuyal, San Diego, CA (US); Wenshu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/798,221

(22) Filed: Feb. 21, 2020

(65) Prior Publication Data
US 2020/0329369 A1 Oct. 15, 2020

Related U.S. Application Data

(60) Provisional application No. 62/838,263, filed on Apr. 24, 2019, provisional application No. 62/832,844, filed on Apr. 11, 2019.

(51) Int. Cl.
*H04W 8/24* (2009.01)
*H04L 1/00* (2006.01)
*H04B 7/0417* (2017.01)

(52) U.S. Cl.
CPC ............ *H04W 8/24* (2013.01); *H04B 7/0417* (2013.01); *H04L 1/0003* (2013.01)

(58) Field of Classification Search
CPC ...... H04W 8/24; H04L 1/0003; H04L 5/0091; H04L 5/0023; H04L 5/0046; H04L 5/001;
(Continued)

(56) References Cited

U.S. PATENT DOCUMENTS

| 2017/0367073 | A1 | 12/2017 | Murugan et al. |
| 2018/0262905 | A1 | 9/2018 | Dhanapal et al. |
| 2019/0387395 | A1* | 12/2019 | Shaheen ........... H04M 1/72463 |

FOREIGN PATENT DOCUMENTS

| WO | 2017025660 A1 | 2/2017 |

OTHER PUBLICATIONS

International Search Report and Written Opinion—PCT/US2020/019525—ISA/EPO—dated Jun. 12, 2020.
(Continued)

*Primary Examiner* — Kabir A Timory
(74) *Attorney, Agent, or Firm* — Procopio, Cory, Hargreaves & Savitch LLP/Qualcomm

(57) ABSTRACT

Aspects are provided which allow an apparatus to efficiently indicate downgraded band combinations associated with carrier aggregation (CA) to a base station, in which one or more UE capabilities such as the DL MIMO of certain supported band combinations may be downgraded in exchange for other UE capabilities such as FD-MIMO and 256/1024QAM. The apparatus, which may be a UE, receives a request from a base station for information associated with downgraded band combinations and for information corresponding to at least one UE capability associated with each of the downgraded band combinations. After receiving the request, the UE sends, to the base station, information indicating the downgraded band combinations and the at least one UE capability. The UE may thus report downgraded band combinations for a subset of supported band
(Continued)

combinations as requested by the base station, thereby minimizing capability reporting of the UE.

30 Claims, 7 Drawing Sheets

(58) Field of Classification Search
CPC ... H04B 7/0417; H04B 7/0413; H04B 7/0628
See application file for complete search history.

(56) References Cited

OTHER PUBLICATIONS

Qualcomm Incorporated: "UE Capability Structure of NR and MR-DC", 3GPP Draft, 3GPP TSG-RAN WG2 Meeting #99bis, R2-1712369, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, Nov. 27, 2017-Dec. 1, 2017, Nov. 17, 2017 (Nov. 17, 2017), XP051371437, 5 pages, Retrieved from the Internet: URL:http://www.3gpp.org/ftp/tsg%5Fran/WG2%5FRL2/TSGR2%5F100/Docs/ [retrieved on Nov. 17, 2017] paragraphs [0004], [0005].

\* cited by examiner

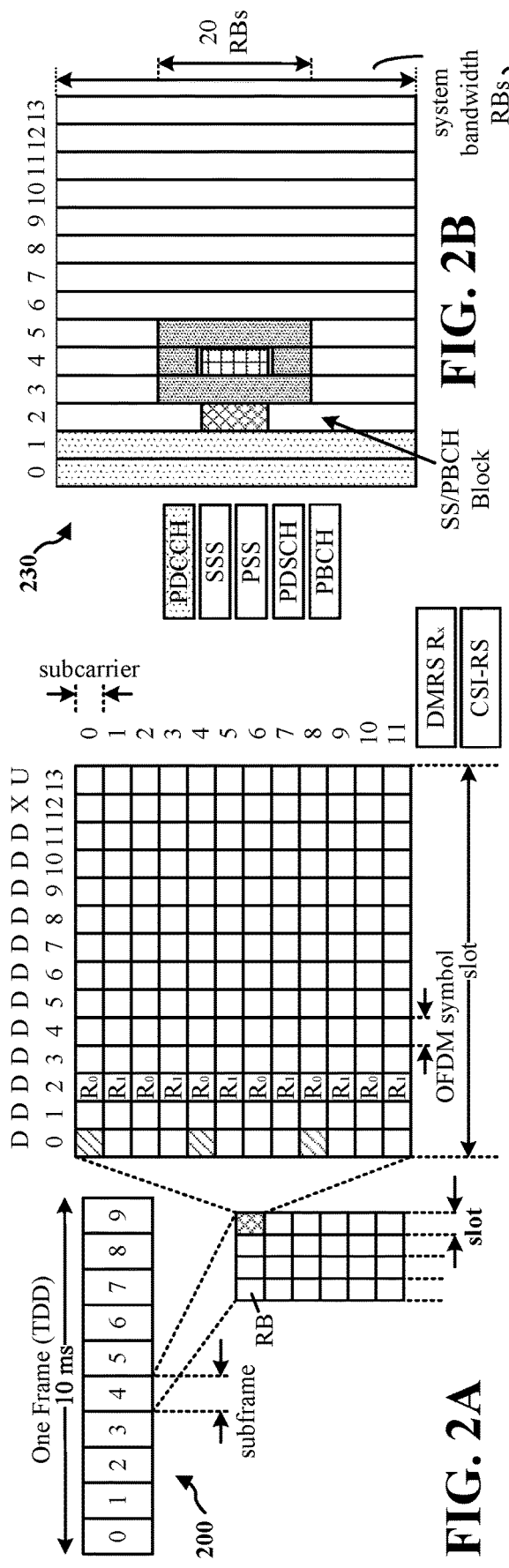
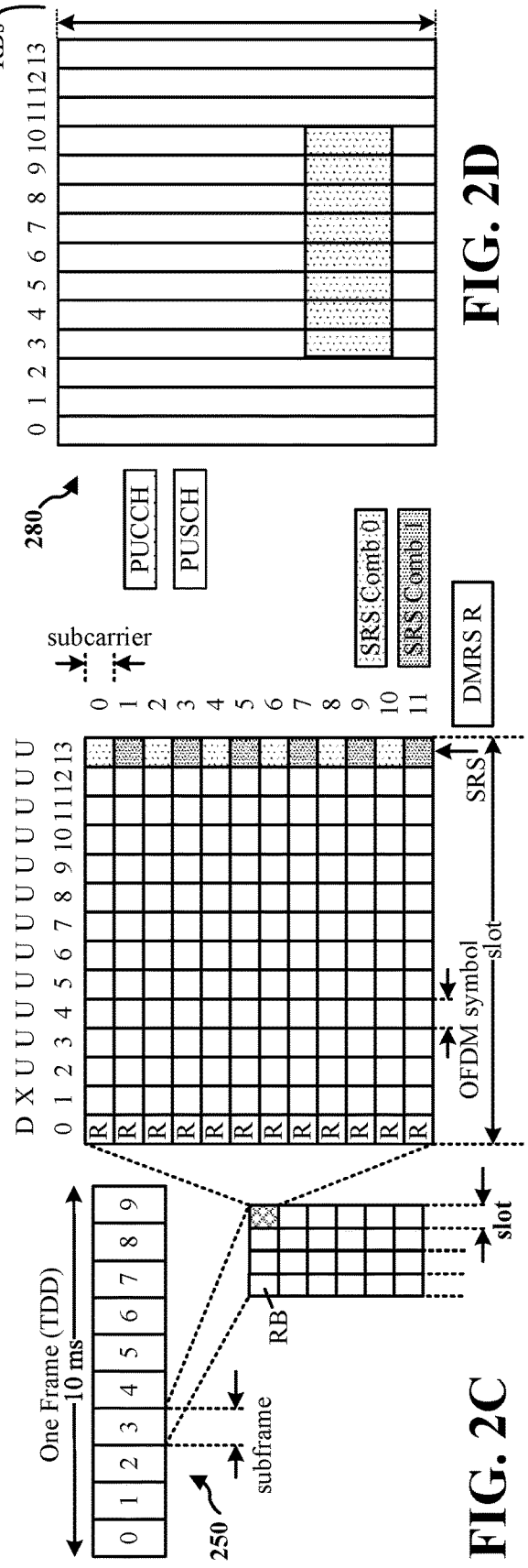

RADIO RESOURCE CONTROL SIGNALING OF DIFFERENT USER EQUIPMENT CAPABILITY OF PARENT BAND COMBINATIONS

CROSS REFERENCE TO RELATED APPLICATION(S)

This application claims the benefit of U.S. Provisional Application Ser. No. 62/838,263, entitled "RADIO RESOURCE CONTROL SIGNALING OF DIFFERENT USER EQUIPMENT CAPABILITY OF PARENT BAND COMBINATIONS" and filed on Apr. 24, 2019, and U.S. Provisional Application Ser. No. 62/832,844, entitled "RADIO RESOURCE CONTROL SIGNALING OF DIFFERENT USER EQUIPMENT CAPABILITY OF PARENT BAND COMBINATIONS" and filed on Apr. 11, 2019, which are expressly incorporated by reference herein in their entirety.

BACKGROUND

Technical Field

The present disclosure relates generally to communication systems, and more particularly, to a wireless communication system between a user equipment and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In carrier aggregation (CA), two or more component carriers (CCs) can be aggregated in order to support wider transmission bandwidths. To identify which band combinations a UE can support for carrier aggregation, a base station may transmit a capability enquiry message (e.g. UECapabilityEnquiry or any other name) to the UE. The UE may then respond to the base station with a capability information message (e.g. UECapabilityInformation or any other name) indicating the CA band combinations the UE can support. This capability information message reported by the UE also indicates the supported downlink (DL)-multiple-input-multiple-output (MIMO) capability for each component carrier or band. For example, the UE may report 1A(4)-3C(4-4) as one supported band combination where bands 1 and 3 both support four layers of DL-MIMO for use in spatial multiplexing in the component carriers of each band (e.g. four layers in one CC for band 1, bandwidth class A, and four layers in two CCs for band 3, bandwidth class C).

Certain UEs may support other UE capabilities additionally to DL-MIMO, for example, Full Dimension (FD)-MIMO (or elevation beam forming (EBF) or massive MIMO) or higher-order quadrature amplitude modulation (QAM) (e.g. 256QAM, 1024QAM, etc.). However, such other capabilities may require additional processing costs incurred or resources expended (e.g. memory, processing cycles, etc.) than those generally available to support CA band combinations at maximum DL-MIMO capability, e.g. 1A(4)-3C(4-4). To compensate for this additional processing, the UE may indicate to the base station that it can downgrade one UE capability to support another UE capability. For example, the UE may indicate to the base station that it can downgrade the associated DL-MIMO capability of certain band combinations (e.g. to support fewer layers of spatial multiplexing) in exchange for one or more other UE capabilities such as FD-MIMO or higher-order QAM (e.g. allowing processing resources to be directed to those other capabilities rather than higher rank spatial multiplexing). Similarly, the UE may indicate to the base station that it can downgrade certain capabilities such as FD-MIMO and/or higher-order QAM in certain band combinations in exchange for an upgraded (greater) number of layers of spatial multiplexing in DL-MIMO for those band combinations. Moreover, the UE may indicate to the base station that it can downgrade FD-MIMO in exchange for upgraded higher-order QAM for certain band combinations, or that it can downgrade QAM in exchange for upgraded FD-MIMO for certain band combinations. Other UE capabilities may be downgraded to support various UE capabilities for particular band combinations.

However, numerous downgraded band combinations may be reported for a single baseband combination (e.g. 1A-3C with 4×4 MIMO capability), and the number of downgraded band combinations may exponentially increase as the number of bands increases. As a result, the UE's capability information can become significantly large for a single message, potentially resulting in numerous reports of UE capability information and inefficient resource usage.

To minimize this potential increase in CA capability reporting, the present disclosure allows a UE to indicate to the base station that other UE capabilities in addition to DL-MIMO capability (or in addition to FD-MIMO or higher-order QAM) exist for supported band combinations in carrier aggregation. After the UE sends this indication, the base station may send a subsequent UE capability enquiry message to the UE requesting information associated with the downgraded band combinations and the other UE capabilities. The UE may then report one or more of its downgraded band combinations in response to the subsequent enquiry by the base station.

In an aspect of the disclosure, a method, a computer-readable medium, and an apparatus are provided. The apparatus may be a UE. In one aspect, the UE receives a request from a base station for information associated with downgraded band combinations and for information corresponding to at least one UE capability associated with each of the downgraded band combinations. The downgraded band combinations are associated with one or more band combinations of a first set of band combinations. Moreover, the downgraded band combinations are band combinations that support the at least one UE capability and a downgrade of at least one other UE capability. After receiving the request, the UE sends, to the base station, information indicating the downgraded band combinations and the at least one UE capability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
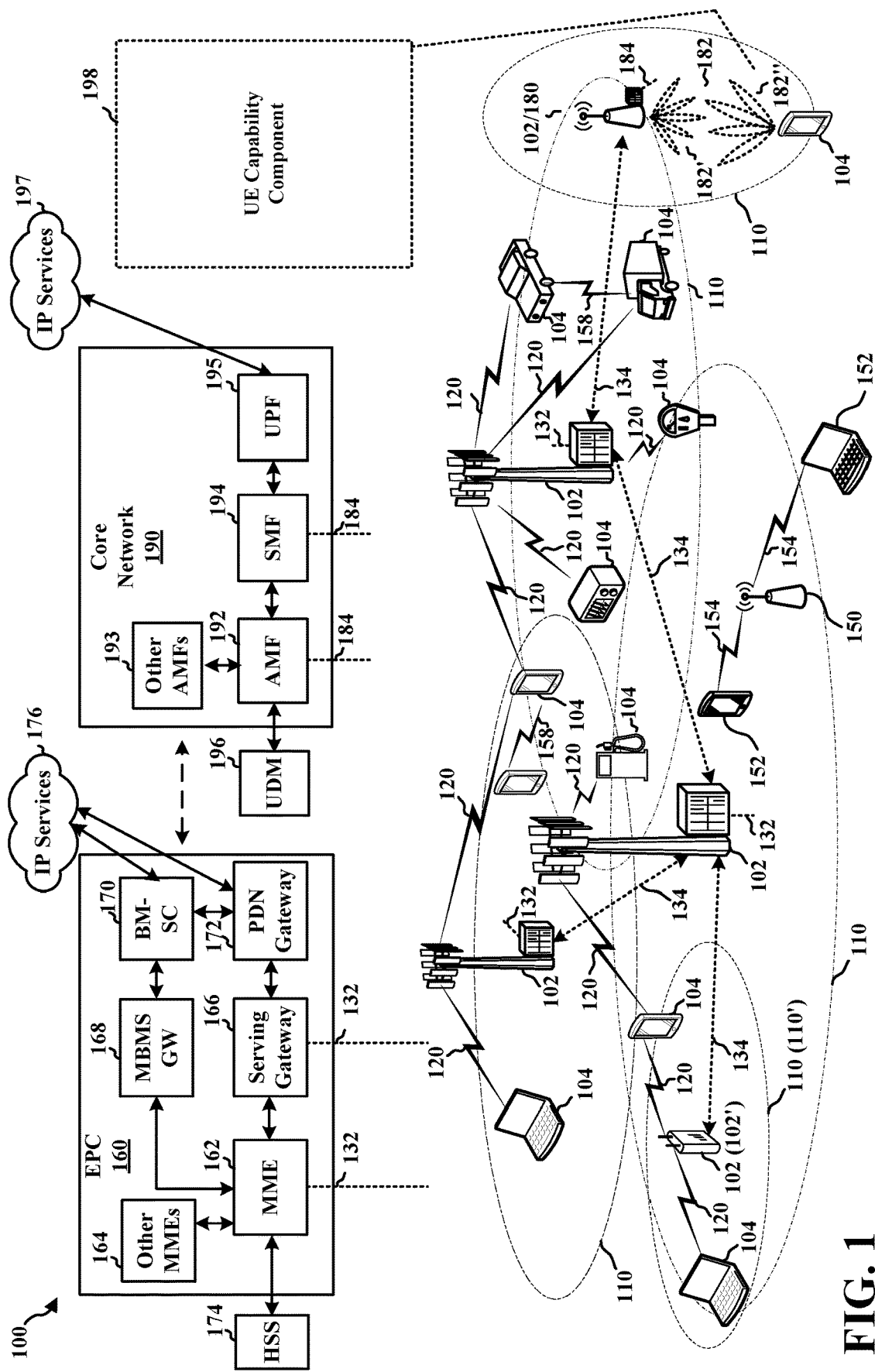
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE capability component 198 which is configured to receive a request from a base station for information associated with downgraded band combinations and for information corresponding to at least one UE capability associated with each of the downgraded band combinations, and to send, to the base station, information indicating the downgraded band combinations and the at least one UE capability. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
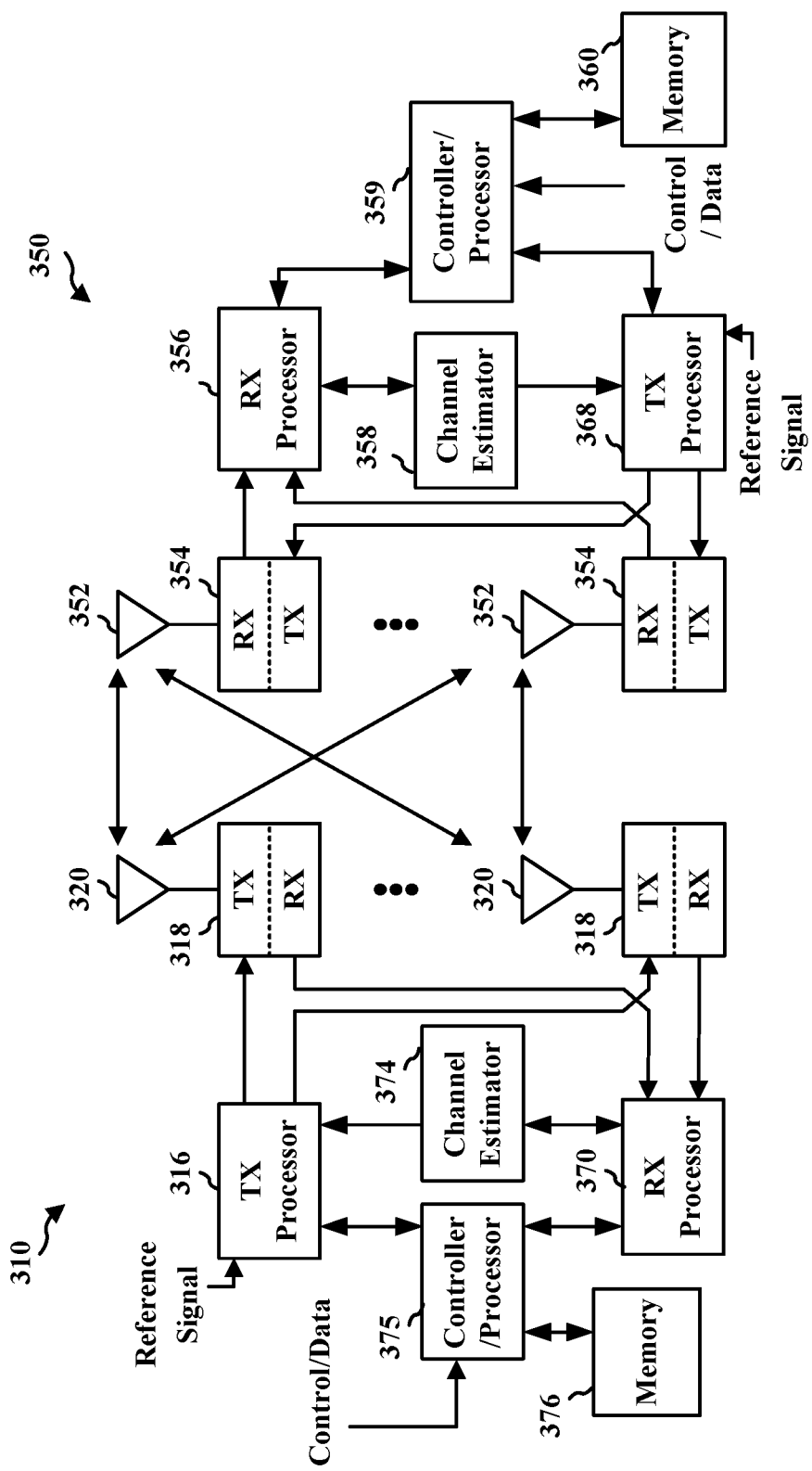
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE capability component 198 of FIG. 1.

In carrier aggregation (CA), two or more component carriers (CCs) can be aggregated in order to support wider transmission bandwidths. Aggregation can be arranged using contiguous CCs within the same operating frequency band (e.g. intra-band contiguous), using non-contiguous CCs within the same operating frequency band but with gaps in between (e.g. intra-band non-contiguous), and using CCs within different operating frequency bands (e.g. inter-band). Moreover, a CA bandwidth class (e.g. A, B, C, D, etc.) may be used to indicate a number of aggregated resource blocks and component carriers within the aggregated channel bandwidth. For example, a CA configuration 1A-3C may be used to indicate inter-band, carrier aggregation capability on operating band 1 (e.g. 2100 MHz) with bandwidth class A and operating band 3 (e.g. 1800 MHz) with bandwidth class C. Alternatively, a CA configuration 1A-3A-7C may be used to indicate inter-band, carrier aggregation capability on operating band 1 (e.g. 2100 MHz) with bandwidth class A, operating band 3 (e.g. 1800 MHz) with bandwidth class A, and operating band 7 (e.g. 2600 MHz) with bandwidth class C. A UE may support multiple CA configurations.

Each component carrier is associated with a serving cell, including primary and secondary serving cells. The primary serving cell (PCell) is served by a primary component carrier (PCC) and is used for control signaling and user data, while the secondary serving cells (SCells) are each served by a secondary component carrier (SCC) for user data. In the CA configuration 1A-3C, for instance, band 1 may be used for the PCC in downlink and uplink RRC connection and data signaling, while band 3 may be used for at most two SCC(s) for additional user data bandwidth. Furthermore, in the CA configuration 1A-3A-7C, band 1 may be used for the PCC in control and data signaling, while band 3 and band 7 may be used for at most one and two SCCs, respectively. Thus, a UE supporting CA configurations 1A-3C and 1A-3A-7C may support maximum aggregated bandwidths of 60 and 80 MHz when within the coverage area of three or four serving cells, respectively.

To identify which band combinations (e.g. 1A-3C, 1A-3A-7C, etc.) a UE can support for carrier aggregation, a base station may transmit a capability enquiry message (e.g. UECapabilityEnquiry or any other name) to the UE. The UE may then respond to the base station with a capability information message (e.g. UECapabilityInformation or any other name) indicating the CA band combinations the UE can support. This capability information message reported by the UE also indicates the supported downlink (DL)-multiple-input-multiple-output (MIMO) capability for each component carrier or band. For example, the UE may report 1A(4)-3C(4-4) as one supported band combination where bands 1 and 3 both support four layers of DL-MIMO for use in spatial multiplexing in the component carriers of each band (e.g. four layers in one CC for band 1, bandwidth class A, and four layers in two CCs for band 3, bandwidth class C). Additionally, the UE may report 1A(4)-3A(4)-7C(4-4) as another supported band combination where bands 1, 3, and 7 all support four layers of DL-MIMO for use in spatial multiplexing in the component carriers of each band (e.g. four layers in one CC for band 1, bandwidth class A, four layers in one CC for band 3, bandwidth class A, and four layers in two CCs for band 7, bandwidth class C). Other CA configurations with different MIMO capabilities (e.g. 2 or 8 layers) can be reported depending on the capability of the UE.

Moreover, certain UEs may support other UE capabilities in addition to DL-MIMO, for example, Full Dimension (FD)-MIMO or 256/1024 quadrature amplitude modulation (QAM). However, such other capabilities may require additional processing costs incurred or resources expended (e.g.

memory, processing cycles, etc.) than those generally available to support CA band combinations at maximum DL-MIMO capability, e.g. 1A(4)-3C(4-4). If a CA configuration (e.g. 1A(4)-3C(4-4)) already consumes all processing resources available to the UE, then the UE may not signal any of the other UE capabilities for any bands in this band combination, since the processing for the other UE capabilities would incur additional costs.

Therefore, to compensate for this additional processing in one aspect, the UE may indicate to the base station that it can downgrade the associated DL-MIMO capability of certain band combinations (e.g. to support fewer layers of spatial multiplexing) in exchange for the one or more other UE capabilities such as FD-MIMO or higher-order QAM (e.g. allowing processing resources to be directed to those other capabilities rather than higher rank spatial multiplexing). For example, if a UE supports CA configuration 1A(4)-3C(4-4), e.g. four layers of spatial multiplexing in DL-MIMO in bands 1 and 3, the UE may indicate that it can alternatively support two layers of DL-MIMO (2×2) for one or more of these bands in order to support FD-MIMO, 1024QAM, etc. on bands 1 and/or 3. Thus, the UE may indicate to the base station that it can support the following, downgraded band combinations: 1A(2-x)-3C(4-4) (band 1 is downgraded in DL-MIMO capability in exchange for another UE capability), 1A(4)-3C(2-2-x) (band 3 is downgraded in DL-MIMO capability in exchange for another UE capability), and 1A(2-x)-3C(2-2-x) (bands 1 and 3 are downgraded in DL-MIMO capability in exchange for another UE capability), where x represents the another capability (e.g. FD-MIMO, 1024QAM, etc.) supported on the corresponding band.

Similarly, in another aspect, the UE may indicate to the base station that it can downgrade capabilities such as FD-MIMO and/or higher-order QAM in certain band combinations in exchange for an upgraded (greater) number of layers of spatial multiplexing in DL-MIMO. For example, if a UE supports CA configuration 1A(2-x)-3C(2-2-x), e.g. 2 layers of spatial multiplexing in DL-MIMO in bands 1 and 3 and a UE capability "x" such as FD-MIMO or 256/1024QAM, the UE may indicate that it can lessen or remove support for that UE capability "x" for one or more of these bands in order to support higher-rank spatial multiplexing on bands 1 and/or 3. Thus, the UE may indicate to the base station that it can support the following, downgraded band combinations: 1A(4)-3C(2-2-x) (band 1 is downgraded in FD-MIMO or modulation order in exchange for 4 layers of spatial multiplexing), 1A(2-x)-3C(4-4) (band 3 is downgraded in FD-MIMO or modulation order in exchange for 4 layers of spatial multiplexing), and 1A(4)-3C(4-4) (bands 1 and 3 are downgraded in FD-MIMO or modulation order in exchange for 4 layers of spatial multiplexing).

Moreover, in a further aspect, the UE may indicate to the base station that it can downgrade one UE capability for certain band combinations to support another UE capability, while the maximum number of spatial layers in DL-MIMO remains fixed. For example, if a UE supports CA configuration 1A(2-x)-3C(2-2-x), where x represents FD-MIMO capability in bands 1 and 3, the UE may indicate that it can lessen or remove support for FD-MIMO capability in one or more of these bands to support higher-order modulation (e.g. 256 or 1024 QAM) on bands 1 and/or 3. Similarly, if a UE supports CA configuration 1A(2-x)-3C(2-2-x), where x represents higher-order modulation (e.g. 256 or 1024 QAM) in bands 1 and 3, the UE may indicate that it can lessen or remove support for higher-order modulation in one or more of these bands to support FD-MIMO in bands 1 and/or 3. Other UE capabilities may similarly be downgraded (e.g. lessened or removed) in exchange for support of various UE capabilities.

However, as can be seen from the above examples, numerous downgraded band combinations may be reported for a single baseband combination (e.g. 1A-3C with 4×4 MIMO capability, FD-MIMO or higher order modulation, etc.). While a CA configuration with two bands such as 1A-3C may include at most a small number of downgraded band combinations to report (e.g. three in the above examples), the number of downgraded band combinations may exponentially increase as the number of bands increases. For example, assuming in one aspect that the other UE capabilities in addition to DL-MIMO include FD-MIMO and higher-order modulation which are each expressed with a single bit (enable/disable), a CA configuration with three bands (e.g. 1A-3A-7C) may include at most seven downgraded band combinations to report, CA configurations with four bands may include at most fifteen downgraded band combinations to report, and CA configurations with five bands may include at most thirty-one downgraded band combinations to report. The number of downgraded band combinations to report may also increase further as other UE capabilities are included or expressed with additional bits; for example, if there are W other UE capabilities where each capability is expressed with B bits, a CA configuration with N bands may include at most $2^{W*B*N}-1$ downgraded band combinations to report. As a UE may support multiple baseband combinations (e.g. 1A-3C, 1A-3A-7C, etc.) and since all of these downgraded band combinations are per baseband combination (e.g. a UE may report three downgraded band combinations for 1A-3C, seven downgraded band combinations for 1A-3A-7C, etc.), the UE's capability information can become significantly large for a single message, potentially resulting in numerous reports of UE capability information and inefficient resource usage.

To minimize the potential increase in CA capability reporting as described above, the present disclosure allows a UE to indicate to the base station that other capabilities in addition to DL-MIMO capability (or in addition to FD-MIMO or higher-order QAM) exist for supported band combinations in carrier aggregation, and only to report one or more of its downgraded band combinations in response to a subsequent enquiry by the base station. For example, in response to a UE capability enquiry message from the base station, the UE may report a UE capability information message including support for a set of CA configurations 1A-3C, 1A-5A, 1A-7C, 1A-3A-5A, 1A-3A-7C, etc., where each configuration includes an initial UE capability (e.g. 4×4 DL-MIMO, FD-MIMO, or higher-order QAM). However, in this example, CA configurations 1A-3C and 1A-3A-7C may be downgraded in exchange for one or more other UE capabilities (e.g. FD-MIMO, 1024QAM, upgraded DL-MIMO, etc.) in addition to the initial UE capability. Therefore, rather than reporting multiple downgraded band combinations with the other UE capability for each CA configuration all at once, the UE may indicate in the capability information message that other UE capabilities in exchange for a downgrade of the initial UE capability exist for certain CA configurations (e.g. 1A-3C and 1A-3A-7C). In response to this indication, the base station may send a subsequent UE capability enquiry message to the UE requesting information associated with the downgraded band combinations and the other UE capability associated with the downgraded band combinations. In its message, the base station may request downgraded band combinations (e.g. 1A(2-x)-3C(4-4), 1A(4)-3C(2-2-x), 1A(2-x)-3C(2-2-x), etc.) for one or more of the supported band combinations (e.g. 1A-3C and/or 1A-3A-7C), and the UE may report its downgraded band combinations associated with the requested combination(s). For example, if the base station requests information only for 1A-3C, the UE may report one or more of the three downgraded band combinations and the other UE capabilities associated with this band combination.

In one aspect, the downgraded band combinations may be distinguished from fallback band combinations. According to this aspect, a fallback combination may be a band combination that is derived from a parent band combination by deactivating SCell(s) or deactivating uplink configuration for SCell(s). For example, where 1A-3A-7C is the parent band combination, the fallback band combinations may include 1A-3A (where the SCell for band 7 is released), 3A-7C (where the SCell for band 1 is released), and 1A-7C (where the SCell for band 3 is released). While the UE may in some cases report all fallback combinations in the same message as their corresponding parent band combination, the UE may also skip or refrain from reporting different fallback combinations to reduce the size of the UE capability information message ("skip fallback"). Using skip fallback, the UE may report only the parent band combination, and the base station may be allowed to infer UE support for all fallback band combinations. Moreover, the UE may indicate when reporting the parent band combination that different capabilities are present in its fallback combinations ("different fallback"). If the UE indicates that different fallback is supported for a parent band combination, then the base station may send a UE capability enquiry subsequently requesting the UE to report the different capability fallback band combinations for that parent band combination.

However, in contrast to fallback combinations, the downgraded band combinations do not require releasing of an SCell or band or an uplink configuration for an SCell or band. As the downgraded band combinations still include all the bands of the baseband combination but with different UE capabilities (e.g. DL MIMO, FD-MIMO, higher-order QAM, etc.), the downgraded band combinations may be considered different parent band combinations rather than fallback band combinations in this context. The UE may report the downgraded band combinations separately from these fallback band combinations in the same or a different UE capability information message.

In an alternative aspect, the downgraded band combinations may be signaled as fallback band combinations. According to this aspect, a fallback combination may be a band combination which is derived from a parent band combination by downgrading a UE capability in one or more bands of the parent band combination in exchange for a different capability, or a band combination which includes one or more bands having different capabilities requiring additional processing than the corresponding bands of the parent band combination. For example, if 1A(4)-3C(4-4) is the parent band combination, the fallback band combinations in this aspect may include 1A(2-x)-3C(4-4), 1A(4)-3C(2-2-x), and 1A(2-x)-3C(2-2-x), where x represents the additional capability (e.g. FD-MIMO, 1024QAM, etc.) supported on the corresponding band in exchange for downgraded DL-MIMO. Similarly, if 1A(2-x)-3C(2-2-x) is the parent band combination, where x represents the additional capability (e.g. FD-MIMO, 1024QAM, etc.) supported on the corresponding band, the fallback band combinations in this aspect may include 1A(4)-3C(2-2-x), 1A(2-x)-3C(4-4), and 1A(4)-3C(4-4), where the additional UE capability x is downgraded in exchange for upgraded DL-MIMO.

As described above, various parenthetical notations have been included after each band/bandwidth class to indicate one or more UE capabilities (e.g., 1A(4)-3C(4-4), 1A(2-FD-MIMO)-3C(2-2-1024QAM), etc.). These parenthetical notations have been included in the present disclosure for clarity; the UE capabilities may not necessarily be reported with the band combinations in parenthetical form. For example, the UE may report supported band combinations (e.g. 1A-3C) and downgraded band combinations separately from the UE capabilities without using parenthetical notations.

Figure 4:
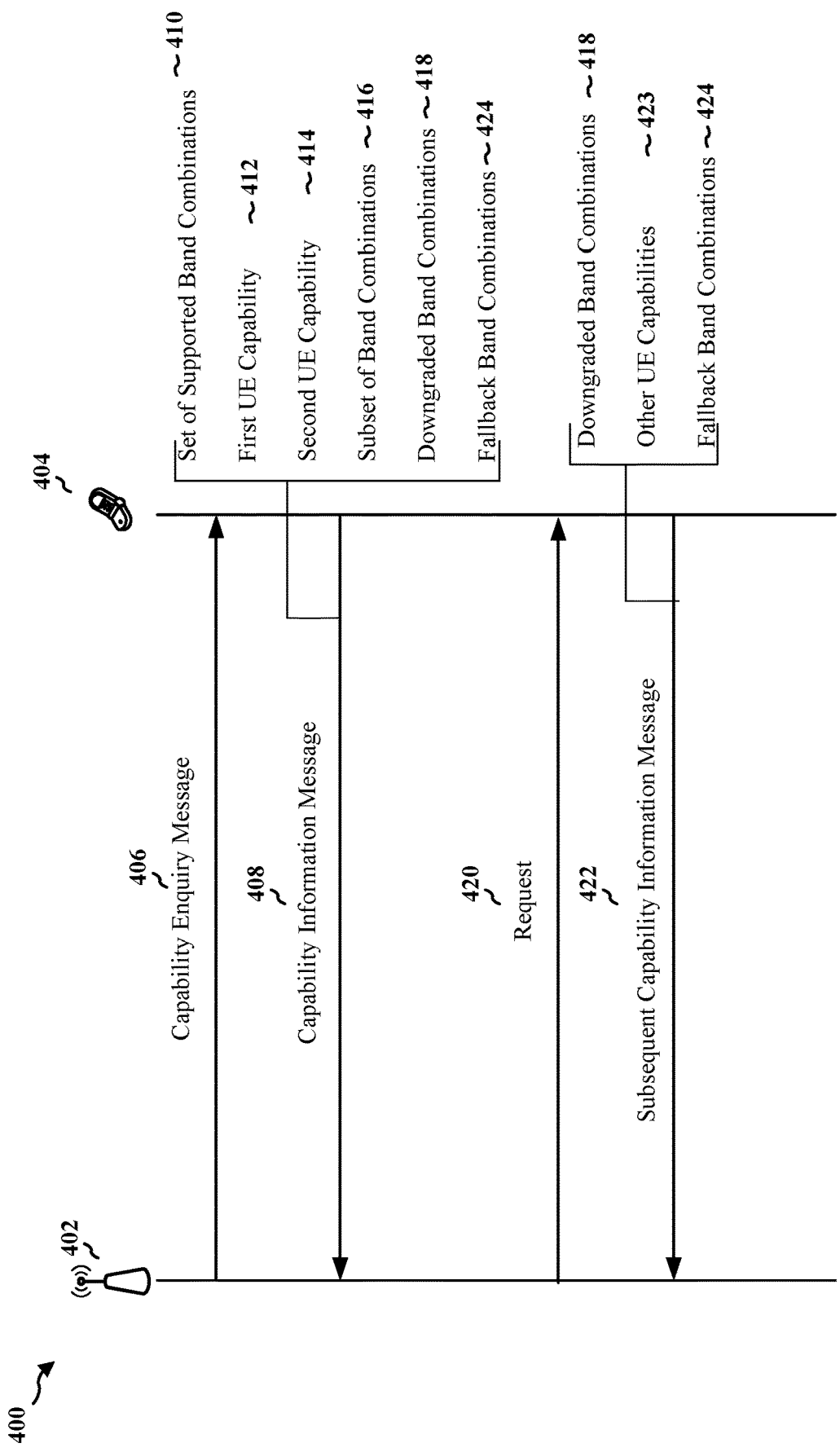
FIG. 4 is a call flow diagram showing an example of wireless communication between a UE and a base station.

FIG. 4 is a call flow diagram 400 between a base station 402 and a UE 404. The base station 402 first sends a UE capability enquiry message 406 to the UE. The UE capability enquiry message 406 may request a set of supported band combinations which the UE may use for carrier aggregation, the DL-MIMO capability (e.g. number of spatial layers) associated with each band in each band combination of the set, and other UE capability information (e.g. FD-MIMO, higher-order modulation, etc.). This message 406 may be transmitted, for example, during initial connection when the base station is first requesting information regarding the UE's capabilities, or may be transmitted subsequent to initial connection (e.g. handover).

After the UE 404 receives the UE capability enquiry message 406, the UE sends a UE capability information message 408 to the base station 402. The UE capability information message 408 may include the set 410 of supported band combinations (e.g. 1A-3C, 1A-5A, 1A-7C, 1A-3A-5A, 1A-3A-7C, etc.) and a first UE capability 412 associated with each band in each band combination of the set. For example, the first UE capability 412 may be the maximum number of layers used for spatial multiplexing in DL-MIMO (e.g. two layers, four layers, or eight layers), FD-MIMO, higher order modulation (e.g. 256 or 1024 QAM), or any initial UE capability. In one aspect, the UE capability information message 408 may indicate that at least one second UE capability 414 (e.g. FD-MIMO, 1024QAM, upgraded DL-MIMO, etc.) which requires additional baseband processing resources is supported for a subset 416 of band combinations in the set 410 of supported band combinations. For example, the UE capability information message 408 may indicate that band combination 1A-3C (which is in this example the subset 416 of set 410 (1A-3C, 1A-5A, 1A-7C, 1A-3A-5A, 1A-3A-7C, etc.)) supports one or more different or other UE capabilities 414 than UE capability 412, and that to compensate for the required additional processing resources for these one or more other UE capabilities, a downgrade of UE capability 412, for example, DL-MIMO capability, FD-MIMO capability, higher-order modulation capability, or other capability 412 associated with band 1 and/or 3 (e.g. at least one downgraded band combination 418) is available in exchange for support of the other UE capabilities 414. The downgraded band combinations 418 are thus associated with one or more band combinations (e.g. 1A and/or 3C) of the subset 416 of band combination(s) (e.g. 1A-3C), and thus support different or other UE capabilities 414 and a downgrade of UE capability 412.

In one example, the first UE capability 412 may be DL-MIMO capability, and the second UE capability 414 may be FD-MIMO or higher-order modulation. Thus, when the indicated band combination in subset 416 is 1A(4)-3C (4-4), where 4 or 4-4 represents the first UE capability 412 capable of being downgraded (e.g. 4 layers of spatial multiplexing in DL-MIMO), the downgraded band combinations 418 associated with 1A(4)-3C(4-4) may include 1A(2-x)-3C(4-4), 1A(4)-3C(2-2-x), and 1A(2-x)-3C(2-2-x), where x represents the second capability 414 (e.g. FD-MIMO, 1024QAM, etc.) supported on the corresponding band.

In another example, the first UE capability 412 may be FD-MIMO or higher-order modulation, and the second UE capability 414 may be upgraded DL-MIMO. Thus, when the indicated band combination in subset 416 is 1A(2-x)-3C(2-2-x), where x represents the first UE capability 412 capable of being downgraded (e.g. FD-MIMO or higher order modulation), the downgraded band combinations 418 associated with 1A(2-x)-3C(2-2-x) may include 1A(4)-3C(2-2-x), 1A(2-x)-3C(4-4), and 1A(4)-3C(4-4), where 4 or 4-4 represents the second UE capability 414 (e.g. upgraded 4 layers of spatial multiplexing in DL-MIMO) supported on the corresponding band.

In a further example, the first UE capability 412 may be FD-MIMO, and the second UE capability 414 may be higher-order modulation. Similarly, the first UE capability 412 may be higher-order modulation, and the second UE capability 414 may be FD-MIMO. Thus, when the indicated band combination in subset 416 is 1A(2-x)-3C(2-2-x), where x represents the first UE capability 412 capable of being downgraded (e.g. FD-MIMO or higher order modulation), the downgraded band combinations 418 associated with 1A(2-x)-3C(2-2-x) may include 1A(2-z)-3C(2-2-x), 1A(2-x)-3C(2-2-z), and 1A(2-z)-3C(2-2-z), where z represents the second UE capability 414 (e.g. the other of FD MIMO or higher order modulation) supported on the corresponding band. Other UE capabilities 412 may alternatively or additionally be downgraded in exchange for support of various UE capabilities 414.

The UE 404 may report the downgraded band combinations 418 in the capability information message 408, or may subsequently report the downgraded band combinations 418 in a separate message in response to a subsequent base station enquiry as described immediately below.

The base station 402 receives the UE capability information message 408 from the UE 404. In this example, the UE capability information message 408 may not directly include the downgraded band combinations 418, but may indicate that downgraded band combinations 418 in exchange for other UE capabilities 414 are available for a subset 416 of band combinations in the set 410 of supported band combinations. Accordingly, the base station 402 sends a request 420 (e.g. a subsequent UE capability enquiry) to the UE 404 for the downgraded band combinations 418 and the other UE capability 414 associated with each downgraded band combination. The UE 404 subsequently sends to the base station 402 a subsequent UE capability information message 422 indicating the downgraded band combinations 418 and the other UE capabilities 423 (for example, 1A(2-FD-MIMO)-3C(4-4)). The other UE capabilities 423 may correspond to the one or more UE capabilities 414 in this example.

While the other UE capabilities 414, 423 identified above in this example of FIG. 4 refer to FD-MIMO and 1024QAM, other UE capabilities which may require additional processing resources can be implemented. For example, the second UE capability 414 may include xQAM, where $x=4^n$ for integer n and n≥2 (e.g. 16QAM, 64QAM, 256QAM, etc.). Alternatively, the second UE capability 414 may only include higher levels of xQAM where n≥4 (e.g. 256QAM, 1024QAM) or where n≥5 (e.g. 1024QAM). In another example, the second UE capability 414 may include xQAM, where $x=2^n$ for integer n and n≥3 (e.g. 8QAM, 16QAM, 32QAM, 64QAM, 128QAM, 256QAM, etc.). Moreover, while the set 410 of supported band combinations and subset 416 described above only use inter-band CA examples, intra-band contiguous and non-contiguous CA may be implemented similarly in accordance with the present disclosure.

In one aspect, when the first UE capability 412 or second UE capability 414 is FD-MIMO, elevation beam forming (EBF), or massive MIMO, the UE may indicate this capability in UE capability information message 408, or 422 using a binary indication. For example, the UE 404 may indicate FD-MIMO is supported or not supported using a single bit in UE capability information message 408. In such case, a downgrade of FD-MIMO may be indicated by removing support for FD-MIMO for a particular band (e.g. by a value '0' or '1' for the bit). Alternatively, the UE may indicate FD-MIMO capability as a maximum number of transmission antennas at the base station which can be supported for a particular band. In such case, a downgrade of FD-MIMO may be indicated by a reduced number of transmission antennas which can be supported for that band (e.g. by a value corresponding to the number of transmission antennas).

In another aspect, when the first UE capability 412 or second UE capability 414 is higher order modulation, the UE may indicate this capability in UE capability information message 408, or 422 as a maximum modulation order for a particular band. For example, the UE 404 may indicate the values 256 and 1024 for 256QAM or 1024QAM, respectively. Alternatively, the UE may indicate higher-order modulation capability using binary indications. For example, the UE 404 may indicate that higher order modulation (256/1024 QAM) is supported or not supported using a single bit in the UE capability information message. The UE 404 may alternatively indicate that one or more higher order modulations (e.g. 256 QAM) are supported using one bit, while one or more even higher order modulations (e.g. 1024 QAM) are supported using another bit in the UE capability information message.

In one aspect, when fallback band combinations require releasing of an SCell or uplink configuration of an SCell, the UE 404 may send its downgraded band combinations 418 and other UE capabilities 414, 423 in UE capability information messages 408/422 to base station 402 separately from fallback band combinations 424. In an alternative aspect, when fallback band combinations may encompass different parent band combinations without releasing SCells, the UE 404 may signal its downgraded band combinations 418 with other UE capabilities 414, 423 to base station 402 as fallback band combinations 424. The base station 402 may indicate in its request 420 (e.g. using a different fallback combination list field or other field) for the UE 404 to indicate its support for reporting of different UE capabilities 414 in the UE's fallback band combinations 424 (e.g. that the UE may report the downgraded band combinations 418 as fallback band combinations 424), and the UE may report its fallback band combinations in response to this request 420.

Figure 5:
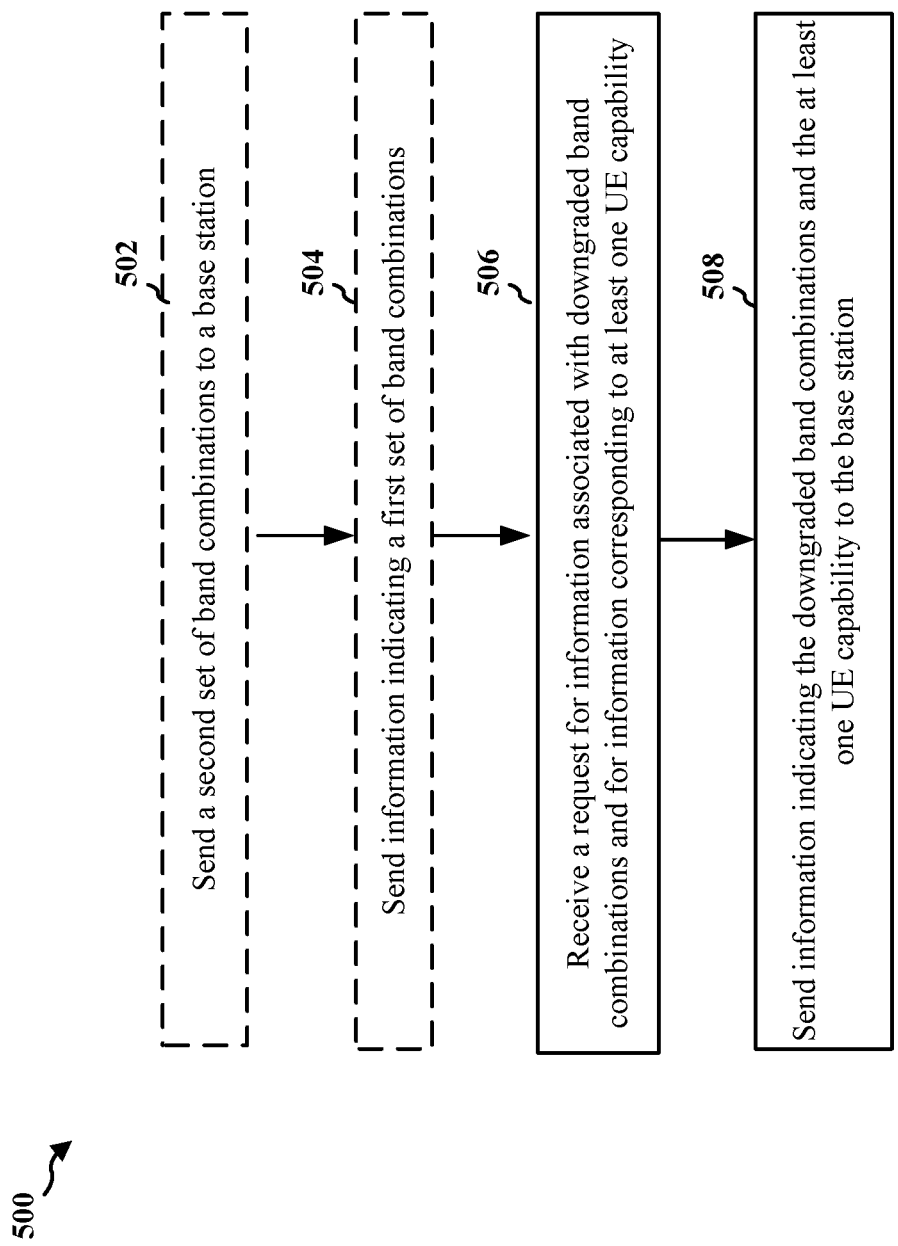
FIG. 5 is a flowchart of a method of wireless communication.

FIG. 5 is a flowchart 500 of a method of wireless communication. The method may be performed by a UE (e.g., the UE 104, 350, 404; the apparatus 602/602'; the processing system 714, which may include the memory 360 and which may be the entire UE 104, 350, 404 or a component of the UE 104, 350, 404, such as the TX processor 368, the RX processor 356, and/or the controller/processor 359). Optional aspects are illustrated in dashed lines. The method allows a UE to efficiently indicate downgraded band combinations to a base station (e.g. base station

102/180, 310, 402) in exchange for other UE capabilities such as FD-MIMO, 256/1024QAM, upgraded DL-MIMO, etc.

At 502, the UE sends information indicating a second set of band combinations to a base station. For example, 502 may be performed by band combination component 608 in FIG. 6. For instance, referring to FIG. 4, after the UE 404 receives a UE capability enquiry message 406, the UE sends a UE capability information message 408 to the base station 402. The UE capability information message 408 may include a set 410 of supported band combinations (e.g. 1A-3C, 1A-5A, 1A-7C, 1A-3A-5A, 1A-3A-7C, etc.) and the UE capability 412 associated with each band in each band combination of the set. For example, the UE capability 412 may be the maximum number of layers used for spatial multiplexing in DL-MIMO (e.g. two layers, four layers, or eight layers), FD-MIMO, higher order modulation (e.g. 256 or 1024 QAM), or any other initial UE capability.

At 504, the UE sends information indicating a first set of band combinations. The first set of band combination may be a subset of the second set of band combinations. For example, 504 may be performed by band combination information component 612 in FIG. 6. For instance, referring to FIG. 4, the UE capability information message 408 may indicate that at least one second UE capability 414 (e.g. FD-MIMO, 1024QAM, upgraded DL-MIMO, etc.) which requires additional baseband processing resources is supported for a subset 416 of band combinations (e.g. the first set of band combinations) in the set 410 of supported band combinations (e.g. the second set of band combinations). For example, the UE capability information message 408 may indicate that band combination 1A-3C (which is in this example the subset 416 of set 410) supports different or other UE capabilities 414 than UE capability 412, and that to compensate for the required additional processing resources, a downgrade of UE capability 412 in band 1 and/or 3 (e.g. at least one downgraded band combination 418) is available in exchange for support of the other UE capabilities 414, 423.

At 506, the UE receives a request from a base station for information associated with downgraded band combinations and for information corresponding to at least one UE capability. The UE capability may be associated with each of the downgraded band combinations. For example, 506 may be performed by request component 604 in FIG. 6. For instance, referring to FIG. 4, the UE 404 may receive a request 420 (e.g. a subsequent UE capability enquiry) from the base station 402 for the downgraded band combinations 418 and for the other UE capabilities 423 associated with each downgraded band combination. The request may alternatively be the capability enquiry message 406 initially received by the UE.

In one aspect, the downgraded band combinations are associated with one or more band combinations of the first set of band combinations, and the downgraded band combinations are band combinations that support at least one UE capability and a downgrade of at least one other UE capability. In various aspects, the at least one UE capability may comprise at least one of DL-MIMO capability, FD MIMO capability, or modulation order. Similarly, the at least one other UE capability may comprise at least one of DL-MIMO capability, FD MIMO capability, or modulation order. For example, referring to FIG. 4, the downgraded band combinations 418 may be associated with one or more band combinations (e.g. 1A and/or 3C) of the subset 416 of band combination(s) (e.g. 1A-3C) that support different or other UE capabilities 414 and a downgrade of at least one UE capability 412. To compensate for the required additional processing resources of these UE capabilities 414, a downgrade of UE capability 412 (e.g. from four layers to two layers in DL-MIMO, from 256QAM to 64 QAM, etc.) is available in exchange for support of the other UE capabilities 414. For example, the first UE capability 412 may be DL-MIMO capability, and the second UE capability 414 may be FD-MIMO or higher-order modulation. Thus, when the indicated band combination in subset 416 is 1A(4)-3C (4-4), the downgraded band combinations 418 associated with one or more band combinations of 1A(4)-3C(4-4) may include 1A(2-x)-3C(4-4), 1A(4)-3C(2-2-x), and 1A(2-x)-3C (2-2-x), where x represents the second capability 414 (e.g. FD-MIMO, 1024QAM, etc.) supported on the corresponding band.

In one aspect, the at least one UE capability comprises modulation order, and the modulation order comprises x quadrature amplitude modulation, where $x=4^n$ for integer n and $n \geq 2$. In another aspect, $n \geq 4$. In an additional aspect, $n \geq 5$. For example, referring to FIG. 4, the second UE capability 414 may include xQAM, where $x=4^n$ for integer n and $n \geq 2$ (e.g. 16QAM, 64QAM, 256QAM, etc.). Alternatively, the second UE capability 414 may only include higher levels of xQAM where $n \geq 4$ (e.g. 256QAM and 1024QAM) or where $n \geq 5$ (e.g. 1024QAM).

Finally, at 508, the UE sends, to the base station, information indicating the downgraded band combinations and the at least one UE capability. For example, 508 may be performed by downgraded band combination component 614. In one aspect, the information indicating the downgraded band combinations and the at least one UE capability are sent to the base station in a capability information message. For instance, referring to FIG. 4, the UE 404 subsequently sends to the base station 402 in response to request 420 a subsequent UE capability information message 422 indicating the downgraded band combinations 418 and the other UE capabilities 414, 423 (for example, 1A(2-FD-MIMO)-3C(4-4)). Alternatively, the downgraded band combinations 418 and other UE capabilities 414 may be sent in the capability information message 408.

In another aspect, the one or more band combinations of the first set of band combinations are indicated in the request from the base station to be reported as fallback band combinations. For example, the one or more band combinations may be indicated within a request different fallback combination list field or other field. For example, referring to FIG. 4, in one aspect, when fallback band combinations require releasing of an SCell or uplink configuration of an SCell, the UE 404 may send its downgraded band combinations 418 and other UE capabilities 414, 423 in UE capability information messages 408/422 to base station 402 separately from fallback band combinations 424. In an alternative aspect, when fallback band combinations may encompass different parent band combinations without releasing of SCells, the UE 404 may signal its downgraded band combinations 418 with other UE capabilities 414, 423 to base station 402 as fallback band combinations 424. The base station 402 may indicate in in its request 420 (e.g. using a different fallback combination list field or other field) for the UE 404 to indicate its support for reporting of different UE capabilities 414 in the UE's fallback band combinations 424 (e.g. that the UE may report the downgraded band combinations 418 as fallback band combinations 424), and the UE may report its fallback band combinations in response to this request 420.

Figure 6:
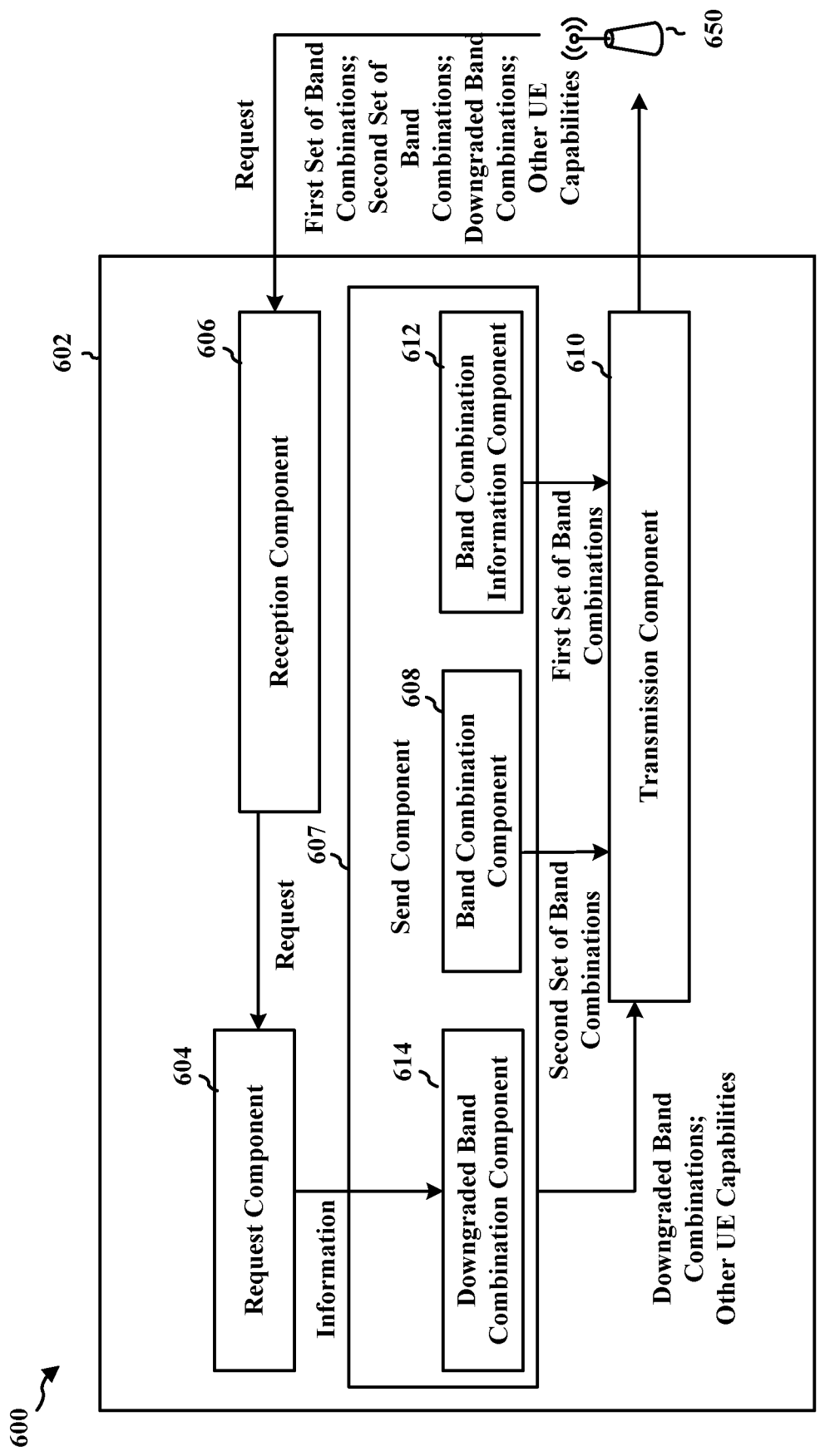
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus 602 may be a UE (e.g., the UE 104, 350, 404). The apparatus includes a request component 604 that is configured to receive, via a reception component 606, a request from a base station 650 (e.g. base station 102/180, 310, 402) for information associated with downgraded band combinations and for information corresponding to at least one UE capability associated with each of the downgraded band combinations, e.g., as described in connection with 506 in FIG. 5. The apparatus includes the reception component 606 that is configured to receive downlink transmissions from the base station 650 including the request. The apparatus also includes a send component 607, which includes a band combination component 608, a band combination information component 612, and a downgraded band combination component 614. The band combination component 608 is configured to send via a transmission component 610 information indicating a second set of band combinations to the base station 650, e.g., as described in connection with 502 in FIG. 5. The band combination information component 612 is configured to send via the transmission component 610 information indicating a first set of band combinations, where the first set of band combinations is a subset of the second set of band combinations, e.g., as described in connection with 504 in FIG. 5. The downgraded band combination component 614 is configured to send via the transmission component 610, to the base station 650, information indicating the downgraded band combinations and the at least one UE capability, e.g., as described in connection with 508 in FIG. 5. The apparatus further includes the transmission component 610 that is configured to transmit to the base station 650 the first set of band combinations received from the band combination information component 612, the second set of band combinations received from the band combination component 608, and the downgraded band combinations and UE capability information received from the downgraded band combination component 614.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
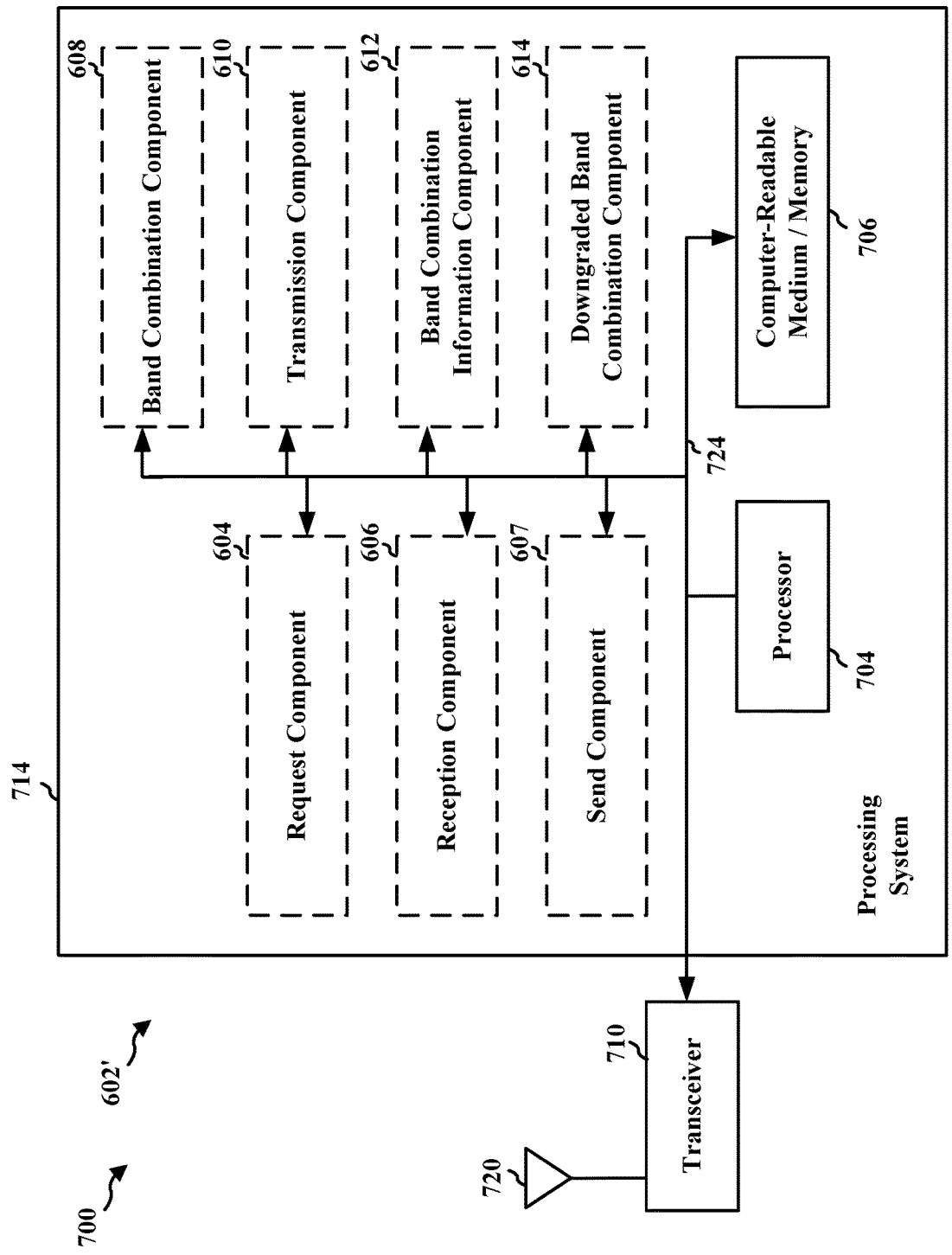
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 607, 608, 610, 612, 614, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 606. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 607, 608, 610, 612, 614. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for receiving a request from a base station for information associated with downgraded band combinations and for information corresponding to at least one UE capability associated with each of the downgraded band combinations; and means for sending, to the base station, information indicating the downgraded band combinations and the at least one UE capability. The downgraded band combinations are associated with one or more band combinations of a first set of band combinations, and the downgraded band combinations are band combinations that support the at least one UE capability and a downgrade of at least one other UE capability.

In one configuration, the at least one UE capability may comprise at least one of downlink (DL) multiple input multiple output (MIMO) capability, full dimension (FD) MIMO capability, or modulation order.

In one configuration, the at least one other UE capability may comprise at least one of downlink (DL) multiple input multiple output (MIMO) capability, full dimension (FD) MIMO capability, or modulation order.

In one configuration, the means for sending may be further configured to send information indicating a second set of band combinations to the base station. The means for sending may also be configured to send information indicating the first set of band combinations, wherein the first set of band combinations is a subset of the second set of band combinations.

In one configuration, the at least one UE capability may comprise modulation order, and the modulation order may comprise x quadrature amplitude modulation, where x=4n for integer n and n≥2. In another configuration, n≥4. In a further configuration, n≥5.

In one configuration, the information indicating the downgraded band combinations and the at least one UE capability may be sent to the base station in a capability information message.

In one configuration, the one or more band combinations of the first set of band combinations may be indicated in the request from the base station to be reported as fallback band combinations.

The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As a result, the present disclosure allows a UE to efficiently indicate downgraded band combinations to the base station in exchange for other UE capabilities such as FD-MIMO, 256/1024QAM, upgraded DL-MIMO, etc. In aspects where the number of supported band combinations with other UE capabilities may be large, the UE can save resources by initially reporting only an indication of different capabilities for those supported band combinations. The UE may then report downgraded band combinations only for the subset of supported band combinations requested by the base station, rather than reporting every downgraded band combination associated with every supported band combination at once. Alternatively, in aspects where the number of supported band combinations with other UE capabilities may be small and less resources may be saved, the UE may report its downgraded band combinations in response to the original capability inquiry message received from the base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   transmitting, to a base station, a capability message indicating a first set of band combinations and at least one corresponding capability;
   receiving a request from the base station for additional capability information associated with downgraded band combinations, that are derived from the first set of band combinations, and at least one different UE capability associated with the downgraded band combinations; and
   sending, to the base station, the additional capability information indicating the downgraded band combinations and the at least one different UE capability for the downgraded band combinations,
   wherein the downgraded band combinations support an added UE capability based on a downgrade of at least one other UE capability.

2. The method of claim 1, wherein the at least one different UE capability comprises at least one of downlink (DL) multiple input multiple output (MIMO) capability, full dimension (FD) MIMO capability, or modulation order.

3. The method of claim 2, wherein the at least one different UE capability comprises the modulation order, which comprises x quadrature amplitude modulation, where $x=4^n$ for integer n and $n \geq 2$.

4. The method of claim 3, wherein $n \geq 4$.

5. The method of claim 3, wherein $n \geq 5$.

6. The method of claim 1, wherein the at least one different UE capability comprises at least one of downlink (DL) multiple input multiple output (MIMO) capability, full dimension (FD) MIMO capability, or modulation order.

7. The method of claim 1, wherein the additional capability information indicating the downgraded band combinations and the at least one different UE capability for the downgraded band combinations are sent to the base station in a capability information message.

8. The method of claim 1, wherein the request from the base station requests a UE capability report for one or more fallback band combinations.

9. The method of claim 1, wherein the capability message for the first set of band combinations further indicates that the UE supports different capabilities for one or more fallback band combination derived from the first set of band combinations.

10. The method of claim 9, further comprising:
    skipping transmission of the additional capability information associated with the downgraded band combinations and the at least one different UE capability associated with the downgraded band combinations until the request from the base station for the additional capability information is received.

11. An apparatus for wireless communication at a user equipment, comprising:
means for transmitting, to a base station, a capability message indicating a first set of band combinations and at least one corresponding capability;
means for receiving a request from the base station for additional capability information associated with downgraded band combinations, that are a subset of the first set of band combinations, and at least one different UE capability associated with the downgraded band combinations; and
means for sending, to the base station, the additional capability information indicating the downgraded band combinations and the at least one different UE capability for the downgraded band combinations,
wherein the downgraded band combinations support an added UE capability based on a downgrade of at least one other UE capability.

12. The apparatus of claim 11, wherein the at least one different UE capability comprises at least one of downlink (DL) multiple input multiple output (MIMO) capability, full dimension (FD) MIMO capability, or modulation order.

13. The apparatus of claim 12, wherein the at least one different UE capability comprises the modulation order, which comprises x quadrature amplitude modulation, where x=4$^n$ for integer n and n≥2.

14. The apparatus of claim 13, wherein n≥4.

15. The apparatus of claim 13, wherein n≥5.

16. The apparatus of claim 11, wherein the at least one different UE capability comprises at least one of downlink (DL) multiple input multiple output (MIMO) capability, full dimension (FD) MIMO capability, or modulation order.

17. The apparatus of claim 11, wherein the additional capability information indicating the downgraded band combinations and the at least one different UE capability for the downgraded band combinations are sent to the base station in a capability information message.

18. The apparatus of claim 11, wherein the request from the base station requests a UE capability report for one or more fallback band combinations from the first set of band combinations.

19. An apparatus for wireless communication at a user equipment, comprising:
a memory; and
at least one processor coupled to the memory and configured to:
transmit, to a base station, a capability message indicating a first set of band combinations and at least one corresponding capability;
receive a request from the base station for additional capability information associated with downgraded band combinations, that are a subset of the first set of band combinations, and at least one different UE capability associated with each of the downgraded band combinations; and
send, to the base station, the additional capability information indicating the downgraded band combinations and the at least one different UE capability for the downgraded band combinations,
wherein the downgraded band combinations support an added UE capability based on a downgrade of at least one other UE capability.

20. The apparatus of claim 19, wherein the at least one different UE capability comprises at least one of downlink (DL) multiple input multiple output (MIMO) capability, full dimension (FD) MIMO capability, or modulation order.

21. The apparatus of claim 20, wherein the at least one different UE capability comprises the modulation order, which comprises x quadrature amplitude modulation, where x=4$^n$ for integer n and n≥2.

22. The apparatus of claim 21, wherein n≥4.

23. The apparatus of claim 21, wherein n≥5.

24. The apparatus of claim 19, wherein the at least one different UE capability comprises at least one of downlink (DL) multiple input multiple output (MIMO) capability, full dimension (FD) MIMO capability, or modulation order.

25. The apparatus of claim 19, wherein the additional capability information indicating the downgraded band combinations and the at least one different UE capability for the downgraded band combinations are sent to the base station in a capability information message.

26. The apparatus of claim 19, wherein the request from the base station requests a UE capability report for one or more fallback band combinations from the first set of band combinations.

27. The apparatus of claim 19, wherein the capability message for the first set of band combinations further indicates that the UE supports different capabilities for one or more fallback band combination derived from the first set of band combinations.

28. The apparatus of claim 27, wherein the at least one processor is further configured to:
skip transmission of the additional capability information associated with the downgraded band combinations and the at least one different UE capability associated with the downgraded band combinations until the request from the base station for the additional capability information is received.

29. A non-transitory computer-readable medium storing computer executable code for wireless communication at a user equipment, the code when executed by a processor cause the processor to:
transmit, to a base station, a capability message indicating a first set of band combinations and at least one corresponding capability;
receive a request from the base station for additional capability information associated with downgraded band combinations, that are a subset of the first set of band combinations, and at least one different UE capability associated with the downgraded band combinations; and
send, to the base station, the additional capability information indicating the downgraded band combinations and the at least one different UE capability for the downgraded band combinations,
wherein the downgraded band combinations support an added UE capability based on a downgrade of at least one other UE capability.

30. The non-transitory computer-readable medium of claim 29, wherein the at least one different UE capability comprises at least one of downlink (DL) multiple input multiple output (MIMO) capability, full dimension (FD) MIMO capability, or modulation order.

* * * * *